(12) United States Patent
Raguenes et al.

(10) Patent No.: US 10,054,475 B2
(45) Date of Patent: Aug. 21, 2018

(54) IMMERSION DETECTOR AND AN AIRCRAFT

(71) Applicant: AIRBUS HELICOPTERS, Marignane (FR)

(72) Inventors: Gwenael Raguenes, Sausset les Pins (FR); Perry Guttin-Lombard, Toulouse (FR); Georges Bailleul, Montaigut/Save (FR)

(73) Assignee: Airbus Helicopters, Marignane (FR)

( * ) Notice: Subject to any disclaimer, the term of this patent is extended or adjusted under 35 U.S.C. 154(b) by 70 days.

(21) Appl. No.: 15/421,574

(22) Filed: Feb. 1, 2017

(65) Prior Publication Data

US 2018/0052032 A1  Feb. 22, 2018

(30) Foreign Application Priority Data

Feb. 4, 2016  (FR) ...................................... 16 00191

(51) Int. Cl.
| | |
|---|---|
| *G01F 23/26* | (2006.01) |
| *G01F 23/24* | (2006.01) |
| *B64D 25/00* | (2006.01) |
| *B64D 45/00* | (2006.01) |
| *G01K 7/16* | (2006.01) |

(52) U.S. Cl.
CPC ......... *G01F 23/268* (2013.01); *G01F 23/246* (2013.01); *G01F 23/263* (2013.01); *B64D 25/00* (2013.01); *B64D 45/00* (2013.01); *G01K 7/16* (2013.01)

(58) Field of Classification Search
CPC ............................... B64D 25/00; B64D 45/00
See application file for complete search history.

(56) References Cited

U.S. PATENT DOCUMENTS

| | | | |
|---|---|---|---|
| 4,679,433 A | 7/1987 | Clinton et al. | |
| 4,806,847 A * | 2/1989 | Atherton | G01F 23/266 324/665 |
| 5,201,223 A | 4/1993 | McQueen | |
| 5,818,731 A * | 10/1998 | Mittal | A47J 37/1266 702/22 |
| 6,078,729 A | 6/2000 | Kopel | |
| 8,576,085 B2 * | 11/2013 | Kessinger | G01F 23/263 340/612 |

(Continued)

FOREIGN PATENT DOCUMENTS

| | | |
|---|---|---|
| DE | 102008044232 | 6/2010 |
| EP | 2733066 | 5/2014 |
| FR | 2580070 | 10/1986 |

OTHER PUBLICATIONS

Canadian Office Action for Application No. 2,954,648 dated Jan. 2, 2018, 5 pages.

(Continued)

*Primary Examiner* — Justin Olamit
(74) *Attorney, Agent, or Firm* — Brooks Kushman P.C.

(57) ABSTRACT

An immersion detector having a thermoresistive detector with at least two temperature probes. The immersion device has a capacitive detector having a capacitor, a cap surrounding said temperature probes and the capacitor, said cap having orifices putting said temperature probes and the capacitor into fluid flow communication with an external medium (EXT) surrounding said immersion detector.

19 Claims, 3 Drawing Sheets

(56) References Cited

U.S. PATENT DOCUMENTS

| | | | |
|---|---|---|---|
| 8,988,088 B2* | 3/2015 | Humbert | G01N 27/048 |
| | | | 324/600 |
| 9,170,144 B2* | 10/2015 | Qi | G01F 23/263 |
| 9,315,263 B2 | 4/2016 | Cacciaguerra | |
| 2011/0110792 A1 | 5/2011 | Mauro et al. | |

OTHER PUBLICATIONS

French Search Report for French Application No. FR 1600191, Completed by the French Patent Office, dated Oct. 3, 2016, 6 Pages.

* cited by examiner

IMMERSION DETECTOR AND AN AIRCRAFT

CROSS REFERENCE TO RELATED APPLICATIONS

This application claims priority to French patent application No. FR 16 00191 filed on Feb. 4, 2016, the disclosure of which is incorporated in its entirety by reference herein.

BACKGROUND OF THE INVENTION

(1) Field of the Invention

The present invention relates to an immersion detector and to an aircraft provided with such an immersion detector.

(2) Description of Related Art

The function of an immersion detector is to detect the presence of water in a space. On an aircraft, an immersion detector is used in particular in the context of ditching on water.

Thus, an immersion detector may be associated with a buoyancy system having inflatable floats. When at least one immersion detector detects the presence of water in a detection space of the aircraft, such as a wheel bay, for example, the immersion detector transmits a signal to a processor unit to cause the float to be inflated. In parallel, the immersion detector may transmit a signal to a distress beacon, to a data recorder, to an emergency lighting system, . . . .

Since by their nature, ditching conditions are unpredictable, the immersion detector must be capable of detecting immersion independently of the direction in which water is traveling through the detection space. Consequently, the immersion detector must be omnidirectional.

In addition, the immersion detector must be capable of identifying quickly and with good probability the unwanted presence of water in the detection space.

In this context, a known immersion detector has a float that is movable within a casing. In the presence of water, the float moves, with this movement causing an immersion detection signal to be issued.

Certain float immersion detectors do not satisfy strict dimensional constraints and/or constraints for omnidirection detection.

Another known immersion detector includes a pressure sensor. The immersion detector detects immersion when a measured pressure is greater than a threshold. Although effective, that type of detector runs the risk of detecting immersion late, i.e. once the detector is deeply immersed.

Another known immersion detector is of optical type. An optical immersion detector suffers from the risk of generating detection errors in the presence of rain or of condensation.

Another known immersion detector is of the thermoresistive type. A thermoresistive immersion detector has two temperature probes together with an electronic measurement and control unit. The temperature probes are electrically powered by the electronic measurement and control unit, so their temperatures rises.

Under such circumstances, the two temperature probes are electrically powered with electric currents of different magnitudes. These electric currents tend to cause the temperature of the two probes to rise differently. When the temperature probes are in the open air, they present two temperatures that are very different because they are passing different currents. In contrast, when the temperature probes are immersed in water, the temperature probes present temperatures that are close together because of the thermal inertia of water. By way of illustration, the two temperature probes may present a temperature difference of 20 degrees Celsius while in air, and a temperature difference of 8 degrees Celsius while in water.

When the electronic measurement and control unit of the immersion detector detects a relatively small temperature difference between the two temperature probes, the electronic measurement and control unit can deduce that the temperature probes are immersed in a liquid.

Although effective, such an immersion detector can generate false alarms when the temperature probes are struck by a stream of air. The stream of air may tend to cool the temperature probes and thus reduce the temperature difference that exists between them. By way of illustration, the temperature probes may behave in similar manner both when in water and also when subjected to a stream of air traveling at a speed of about 50 kilometers per hour.

In addition, a temperature probe may possess a response time that is relatively slow. Under such circumstances, immersion may be detected only at the end of a relatively long duration, which can lead to problems following ditching.

The use of such an immersion detector on an aircraft can thus be problematic.

Furthermore, another known immersion detector is a detector of capacitive type.

A capacitive immersion detector comprises a capacitor having at least one metal plate. Immersion is then detected by frequency measurement proportional to the capacitance of the capacitive immersion detector. In the presence of a liquid, the dielectric constant of the capacitor, and thus its capacitance, varies. If the capacitance varies substantially, the immersion detector can transmit a signal indicating immersion.

If the fluid that is to be observed is an electrically insulating fluid, the capacitive immersion detector has two metal plates separated from each other by a space in order to form a capacitor. When the space is full of fluid, the capacitance of the capacitor varies.

If the fluid that is to be observed is a fluid that is not electrically insulating, the capacitive immersion detector comprises a metal conductor that is covered in dielectric insulation. When the space fills with liquid, then the capacitance between the two capacitor plates varies significantly.

Such a capacitive detector can also measure the depth of liquid in an enclosure. Document FR 2 580 070 thus describes a capacitive device used as a fuel gauge.

The use of a capacitive detector for determining the presence of immersion is advantageous. Nevertheless, such a detector can be sensitive to humidity ("humidité" in French language). A high degree of humidity can thus generate a false immersion alarm, which can lead to problems in the context of an aviation application.

Under such circumstances, the design of an immersion detector that is intended in particular for the field of aviation turns out to be difficult because of the particular conditions of use of such an immersion detector. In particular, an aircraft immersion detector is sometimes arranged in a zone that is open to the outside of the aircraft, such as a wheel bay, in order to detect ditching on water as quickly as possible. An airplane immersion detector is then subjected to difficult environmental conditions. Thus an aircraft immersion detector is subjected to a condensation phenomenon, to high levels of humidity, to strong rain, and to streams of air that can generate false alarms concerning the presence of water.

In order to avoid generating false alarms of immersion on board an aircraft, the number of immersion detectors may be increased. Such immersion detectors supply data that is processed by using filtering and voting techniques in order to derive consolidated information about the presence of water. That solution is advantageous.

Nevertheless, when the immersion detectors are identical, a common failure can make the entire system inoperative. A manufacturer can then envisage using different immersion detectors, but then needs to certify a plurality of different immersion detectors, which leads to a financial burden that needs to be taken into consideration.

Furthermore, that solution requires the use of a relatively complex device for filtering data.

Finally, installing a plurality of immersion detectors can have a non-negligible economic impact and can lead to difficulties of integration.

In addition, an aircraft may impose relatively strict dimensional constraints on an immersion detector. By way of illustration, an immersion detector must be relatively small in order to be capable of being placed in a landing gear bay.

Documents U.S. Pat. No. 6,078,729, U.S. Pat. No. 5,201,223, EP 2 733 066, US 2011/110792, and DE 10 2008 044232 are known and remote from the invention.

BRIEF SUMMARY OF THE INVENTION

An object of the present invention is thus to provide a novel immersion detector seeking to optimize the detection by the immersion detector of immersion in a liquid.

According to the invention, an immersion detector is provided with a thermoresistive detector having at least two temperature probes projecting from a base and extending in elevation along an elevation direction, the thermoresistive detector including a first control and measurement unit connected to each temperature probe, the first control and measurement unit responding to the temperature of each temperature probe to generate first immersion information when the thermoresistive detector is immersed in a fluid.

The immersion detector includes a capacitive detector, the capacitive detector having a capacitor provided with at least one metal plate projecting from said base and extending in the elevation direction, the capacitive detector having a second control and measurement unit connected to the capacitor, the second control and measurement unit responding to the capacitance of the capacitor to generate second immersion information when the capacitive detector is immersed in the fluid, the immersion detector having a processor unit in communication with the first control and measurement unit and with the second control and measurement unit to generate and transmit an output signal indicating that the immersion detector is immersed when in the presence of the first immersion information and of the second immersion information, the immersion detector having a cap surrounding said temperature probes and the capacitor, the cap presenting orifices putting the temperature probes and said capacitor into fluid flow communication with an external medium surrounding the immersion detector.

The term "control and measurement unit" designates an electronic unit suitable for electrically powering at least one sensor and for processing the measurements taken by the sensor. Thus, the first control and measurement unit electrically powers the temperature probes and processes the measurements taken by the temperature probes. Likewise, the second control and measurement unit electrically powers the capacitor and processes the measurements taken by the capacitor.

The term "processor unit" designates an electronic unit suitable for electrically powering the control and measurement unit and for processing the information transmitted by the control and measurement unit. Furthermore, the processor unit can perform operating tests on the immersion detector. In addition, the processor unit can serve to filter the impacts of lightning and of electromagnetic disturbances.

The term "information" refers to data about immersion, which data may be in the form of an electric signal, a value of a parameter, . . . .

Thus, the immersion detector does not have a single sensor but rather two different sensors that co-operate with each other.

A first sensor is a thermoresistive detector. The thermoresistive detector may be a conventional detector provided with temperature probes known under the name "PT100", for example.

The first control and measurement unit then electrically powers the probes with direct current (DC) with different current values, e.g. respectively equal to 1 milliamp (mA) and 20 mA. The temperature of the two probes rises differently under normal conditions. Consequently, the two temperature probes will present temperatures that are different, leading to different electric voltages across the terminals of the two temperature probes.

The first control and measurement unit can then evaluate the temperature difference between the two temperature probes by measuring the difference in electric potential between the two temperature probes. The first control and measurement unit determines the electrical potential difference, determines the temperature difference between the two temperature probes, and deduces therefrom in particular whether a liquid is present as a function of the temperature difference.

Furthermore, a second sensor is a capacitive detector. For example, the capacitive detector is a detector of a conventional type having a capacitor.

The capacitor may comprise one metal plate on its own and dielectric insulation arranged on one face of another metal plate. Together the metal plates form a capacitor with a dielectric constant that varies as a function of the presence of fluid.

Alternatively, the capacitor may comprise two metal plates without insulation.

Furthermore, the capacitive detector includes a second control and measurement unit that is electrically connected to the capacitor.

The second control and measurement unit can then measure the capacitance of the capacitor by measuring frequency, which capacitance has a dielectric constant that varies as a function of the presence of fluid.

Under such circumstances, the capacitive detector and the thermoresistive detector are carried by a base of the immersion detector. The temperature probes and the capacitor then project at least in part in elevation from the base.

Furthermore, the immersion detector has a cap surrounding the portions of the temperature probes and the capacitor that projects from the base.

The cap may include holder members for holding the temperature probes and the capacitor in place. For example, the cap may have a hollow space containing a sheet with three perforations through which the temperature probes and the capacitor pass respectively.

In order to enable the thermoresistive detector to operate, the cap has orifices, in particular at its periphery. In the event of the immersion detector being immersed in a liquid, the orifices then allow liquid to penetrate into the inside of the cap, and other orifices allow the air present in the cap to escape at the same time to the outside. These orifices then enable a liquid to reach the temperature probes and the capacitor when the immersion detector is immersed.

The presence of liquid is then detected under normal conditions by the capacitive detector and by the thermoresistive detector. When the capacitive detector and the thermoresistive detector both indicate the presence of liquid, the treatment unit issues a warning signal about the presence of liquid, possibly to a system for inflating a float, to a distress beacon, . . . .

In novel manner, the immersion detector thus presents two distinct sensors. Consequently, the rate at which unwanted false alarms occur can be minimized.

Furthermore, the processor unit can verify the operation of the immersion detector when the aircraft is switched on. If a failure of the thermoresistive detector or of the capacitive detector is detected, then that failure is indicated to an operator. The immersion detector can then be replaced before flight.

Furthermore, the immersion detector also makes it possible to reconcile two mutually opposing requirements.

The immersion detector can possess a short response time for detecting water in spite of the presence of a cap arranged over the temperature probes and the capacitor. The positions and the sizes of the orifices in the cap can be optimized so that the temperature probes and the capacitor come into contact with water as quickly as possible independently of the position in three-dimensional space of the immersion detector. The orifices can also be of dimensions that are chosen to reduce the risk of the orifices becoming obstructed in a dusty environment.

The immersion detector may also be relatively insensitive to streams of air. The air stream naturally encountered by an aircraft has a negative impact on the operation of a thermoresistive detector. The presence of orifices in the cap would then seem to be counterproductive. The dimensions of the orifices can nevertheless be minimized in order to attenuate sensitivity to a stream of air. Under such circumstances, although the cap is pierced by orifices it nevertheless tends to protect the temperature probes against impacts with the air stream, doing this on its own or optionally in combination with a hood described in detail below.

Furthermore, the cap can also provide the temperature probes and the capacitor with mechanical protection against an accidental impact.

The immersion detector of the invention also serves to avoid any common failure in the detection portion insofar as the two detectors that are used are of different types.

Furthermore, the immersion detector can greatly simplify installation, with it being possible to install only one immersion detector per aircraft. Because of its two technologies and its electronics, the use of one immersion detector tends to obtain low rates of occurrence for false detection. The operating safety constraints imposed by certification regulations can potentially be achieved using a single immersion detector.

The two detection technologies can also make it possible to be insensitive to other magnitudes that may have an influence, namely a stream of air, the presence of humidity, . . . .

Furthermore, the immersion detector can detect immersion in water but can easily be arranged to constitute other types of detector.

The immersion detector can operate in the presence of any electrically conductive fluid by adapting the value stored in the immersion detector for the dielectric constant of the liquid. In order to detect a particular liquid, the second control and measurement unit may be adapted to take account of the dielectric constant of that particular liquid. The immersion detector can thus also detect the presence of any type of fluid (oil, glycol, . . . .)

The immersion detector may be transformed into a thermoresistive detector only by inhibiting the capacitive detector, or conversely, into a capacitive detector only by inhibiting the thermoresistive detector. For example, the processor unit may process only data coming from the capacitive detector in order to use the immersion detector as a capacitive system, or only data coming from the thermoresistive detector in order to use the immersion detector as a thermoresistive system.

When transformed into a capacitive system only, the immersion detector can thus become a level sensor. The capacitive detector then provides information proportional to the level of fluid in the immersion detector.

When transformed into a thermoresistive system, the immersion detector can also become a redundant temperature sensor. The two temperature probes can thus be used as temperature sensors. The electronic processor unit can then take the data provided by the two temperature probes and make comparisons, take an average, or perform voting in order to provide consolidated temperature information with reliability and accuracy at levels that are much better than from a single probe.

When transformed into a thermoresistive system only, the immersion detector can thus become an air stream sensor by removing the capacitive detector. The air stream impacting the temperature probes then enables the electric potential to be aligned and enables the air stream to be detected. The intensity of the air stream can thus be determined since it is directly proportional to the electric potential differences.

The immersion detector may also include one or more of the following characteristics.

Thus, the first control and measurement unit may determine a gradient that is a function of variation in temperature difference between the two temperature probes over a measurement duration, and then compare the gradient with a threshold, the first immersion information being issued when the gradient is greater than the threshold.

The gradient may be a temperature difference gradient as such, or it may be a gradient of a voltage difference between the voltages that exist at the terminals of the temperature sensors. For example, each temperature sensor may present a respective voltage between its terminals. The first control and measurement unit then determines a first voltage present between the terminals of a first temperature probe and a second voltage present between the terminals of a second temperature probe. The first control and measurement unit then determines the difference between the first and second voltages, with the gradient being equal to the variation in this difference over a predetermined measurement duration.

The response time of the temperature probe is then possibly rather long. Under such circumstances, this variant proposes not taking account of a temperature, but rather taking account of a gradient that is function of the temperatures of the temperature probes.

This gradient is compared with a threshold that is advantageously determined using the following relationship:

$$GTH = C1 * DT + C2$$

where "GTH" represents said gradient threshold, "DT" represents the measurement duration, and "C1" and "C2" represent predetermined constants, "*" representing the multiplication sign and "+" representing the addition sign.

By way of example, the constant C1 may be equal to −0.0875 and the constant C2 may be equal to 0.75.

The threshold may also be bounded. For example, the threshold may be bounded by an upper bound equal to 0.2. This upper bound provides safety relative to potential parasitic disturbances.

Furthermore, the base may house the first control and measurement unit.

The capacitive detector then has a base that carries both temperature probes. The first control and measurement unit is then arranged in the base.

The term "base" means a casing carrying the temperature probes and the capacitor, and having arranged therein the first control and measurement unit.

In addition, the base may also house the processor unit, or indeed the second control and measurement unit.

The processor unit and/or the first control and measurement unit and/or the second control and measurement unit may form a single electronic unit. By way of example, each unit may be in the form of a segment of a program stored and executed by a processor, or indeed a portion of an electronic circuit.

Furthermore, the processor unit may include an electrical power supply device and a microcontroller, the electrical power supply device being for connection to an electric circuit outside the immersion detector, the microcontroller being connected to the first control and measurement unit and to the second control and measurement unit.

The electrical power supply device is optionally capable of generating electricity presenting a voltage of 3.3 volts (V) from electricity that is available at 28 V. The electrical power supply device may also filter out the consequences of a lightning strike or of electromagnetic disturbances.

The microcontroller communicates with the control and measurement units in order to monitor the states of the capacitive and thermoresistive detectors by analyzing the data transmitted by the first control and measurement unit and the data transmitted by the second control and measurement unit.

The data received by the processor unit as a function of time may be temporarily filtered by the microcontroller in order to detect immersion more or less quickly. Filtering also makes it possible to detect whether immersion is permanent or transient. With a high degree of time filtering, the microcontroller is adjusted to detect a permanent presence of liquid. Conversely, with a lower degree of time filtering, the microcontroller is adjusted to detect a presence of water that may be permanent or transient.

The microcontroller also makes it possible to diagnose the state of the thermoresistive detector and the state of the capacitive detector by performing a self-test function.

When the immersion detector is switched on, the microcontroller can drive the thermoresistive detector by powering it electrically with a particular electric current and can then verify whether the information returned by the thermoresistive detector corresponds to stored information. This operation can also be performed with the capacitive detector.

In another aspect, the orifices are arranged in at least two distinct zones of the cap that are offset in elevation.

The term "zone" designates an outline of the cap extending in elevation over a short length that is less than the total length over which the cap extends.

The orifices of one zone may for example represent inlet orifices enabling a liquid to penetrate into the immersion detector, whereas the orifices of the other zone may represent orifices for evacuating air progressively as the inside space of the immersion detector fills up.

In addition, the cap optionally includes a side wall laterally defining an inside space that extends in elevation from a root to a tip. Under such circumstances, the cap includes a top wall closing the tip, the temperature probes and said capacitor being arranged at least in part in the inside space.

Consequently, at least one top orifice may be arranged in the top wall and at least one bottom orifice may be arranged in the bottom wall.

Furthermore, the cap may surround the base at least in part in order to isolate the content of the base from the outside.

In another aspect, the immersion detector may include a hood surrounding the cap at least in part, the hood comprising a side partition laterally defining an inside volume, the side partition extending in elevation from a seat to a head, said hood having a top partition closing said head, the cap being arranged at least in part in said volume.

The immersion detector then has two assemblies. One detection assembly is constituted by sensitive and electronic portions, namely the capacitive detector and the thermoresistive detector. Another assembly is represented by the cap, and by the hood, if any.

The hood makes it possible to optimize the operation of the immersion detector in the presence of a stream of air.

Under such circumstances, the seat of the hood is optionally screwed to the root of the cap.

Furthermore, at least one top opening is formed in the top partition, and at least one side opening is formed in the side partition.

The openings enable a fluid to reach the temperature probes and the capacitor by passing via the orifices in the cap.

Optionally, none of the openings in the hood leads directly to an orifice in the cap.

The term "leads directly" means that none of the openings faces an orifice in a transverse direction perpendicular to an axis in elevation of the immersion detector. Consequently, each orifice is offset relative to an opening.

As a result, the shape of the hood and the locations and the dimensions of the openings in the cap and the orifices in the hood serve to "break" any stream of air that might disturb the temperature probes, while having very little impact on the response time of the immersion detector following its immersion in a liquid.

In addition to an immersion detector, the invention provides an aircraft having at least one immersion detector of the invention, and possibly only one immersion detector of the invention.

Specifically, the immersion detector may present a rate of false detections that is low, sufficiently low to make using another detector pointless.

Optionally, the aircraft extends transversely from a right side to a left side on either side of an anteroposterior plane of symmetry, the aircraft extending longitudinally from a front end to a rear end on either side of a midplane of symmetry orthogonal to the anteroposterior plane, the aircraft being provided with at least two immersion detectors arranged respectively at the front end and at the rear end of the aircraft or on the left side and on the right side of the aircraft.

By way of example, two immersion detectors are used not because of the rate of failures in each immersion detector, but in order to optimize detection depending on how ditching on water takes place.

For example, an aircraft may ditch by initially striking the water with its front end or with its rear end. By arranging one immersion detector at the front end and another immersion detector at the rear end, the system can present an advantageous detection time regardless of the way in which the aircraft ditches.

The invention also provides an immersion detection method using an immersion detector of the invention, the method comprising the following steps:

when said thermoresistive detector is immersed in a fluid, the first control and measurement unit generating first immersion information as a function of the temperatures of each the temperature probes;

when said capacitive detector is immersed in said fluid, the second control and measurement unit generating second immersion information as a function of the capacitance of said capacitor; and the processor unit generating and transmitting an output signal indicating said immersion detector is immersed when said processor unit is in the presence of the first immersion information and the second immersion information.

Optionally, the first control and measurement unit determines a gradient that is a function of variation in temperature difference between the two temperature probes over a measurement duration, and it compares the gradient with a threshold, the first immersion information being issued when the gradient is greater than the threshold.

This threshold may be determined using the following relationship:

$$GTH = C1*DT + C2$$

where "GTH" represents said gradient threshold, "DT" represents the measurement duration, and "C1" and "C2" represent predetermined constants, "*" representing the multiplication sign and "+" representing the addition sign.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Three mutually orthogonal directions X, Y, and Z are shown in some of the figures.

The direction Z is said to be "in elevation". The term "in elevation" thus relates to this elevation direction.

The direction X and the direction Y are said to be transverse. The term "transverse" thus relates to a direction orthogonal to direction Z in elevation.

The aircraft 1 comprises an airframe 2 extending longitudinally from a front end 3 to a rear end 4 along an anteroposterior plane P1 of symmetry. Furthermore, the airframe 2 extends transversely from a left side 5 to a right side 6 on either side of the anteroposterior plane, and in elevation from a bottom portion 7 towards a top portion 8 (where the terms "left" and "right" are relative to FIG. 1).

Figure 1:
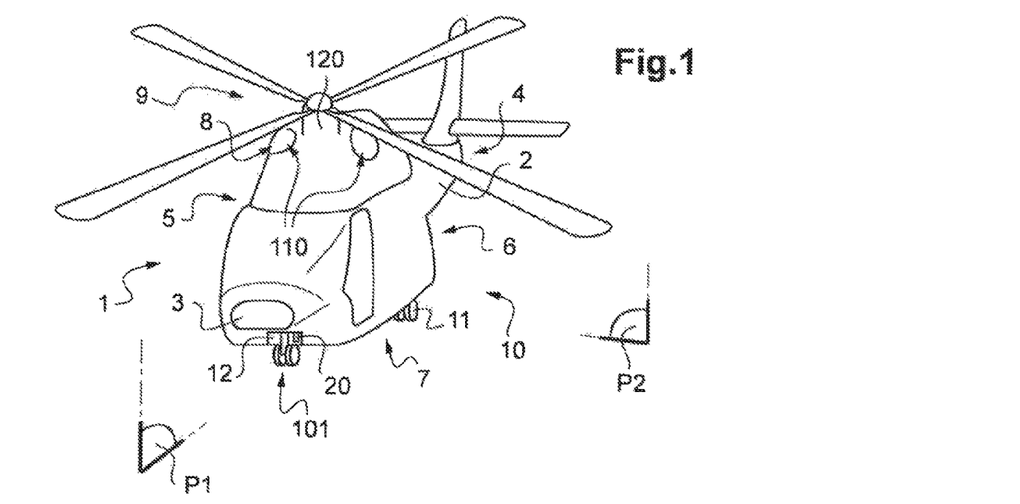
FIG. 1 shows an aircraft of the invention

The anteroposterior plane P1 then separates a left side and a right side of the aircraft transversely. In addition, a midplane P2 then separates a front end and a rear end of the aircraft longitudinally. For example, the rear end and the front end may present equal lengths.

The bottom portion 7 includes an airframe bottom wall while the top portion 8 includes an airframe top wall. The bottom wall 7 is conventionally provided with landing gear 10. By way of example, the landing gear 10 possesses a plurality of undercarriages 11. Each undercarriage shown is housed at least in part in a wheel bay 12.

For example, a front undercarriage is situated at the front end of the aircraft. Two rear undercarriages are situated at the rear end of the aircraft, e.g. respectively on the left side and on the right side.

The top portion 8 may support a rotor 9 contributing to providing the aircraft with lift and possibly also propulsion. The bottom portion 7 may include a subfloor structure defined in particular by the floor of an inside space and the outer shell of the airframe.

The top portion may carry a rotor 9 in the context of a rotorcraft. The rotor 9 is rotated by at least one engine 110 acting through a main power transmission gearbox 120. The engine 110 may be a turboshaft engine having an expansion turbine secured to a drive shaft, the drive shaft being connected by a mechanical system to the gearbox 120.

The bottom portion 7 may then represent the bottom half of the airframe 2 while the top portion 8 represents the top half of the airframe 2.

Furthermore, the aircraft 1 may be provided by way of example with a buoyancy system (not shown) in order to be able to ditch on water, and/or a distress beacon.

In addition, the aircraft 1 includes at least one immersion detector 20, and possibly only one immersion detector 20.

The immersion detector 20 may be connected to auxiliary equipment, such as a buoyancy system and/or a distress beacon and/or a warning system. By way of example, such a warning system may include visual and/or sound and/or haptic warning means.

By way of illustration, the immersion detector is arranged in a wheel bay 12. Nevertheless, the immersion detector may be arranged in other locations, e.g. in a cabin, in a hold, in an underfloor space, . . . .

In a variant, two immersion detectors are arranged in the aircraft, e.g. in two wheel bays.

Figure 2:
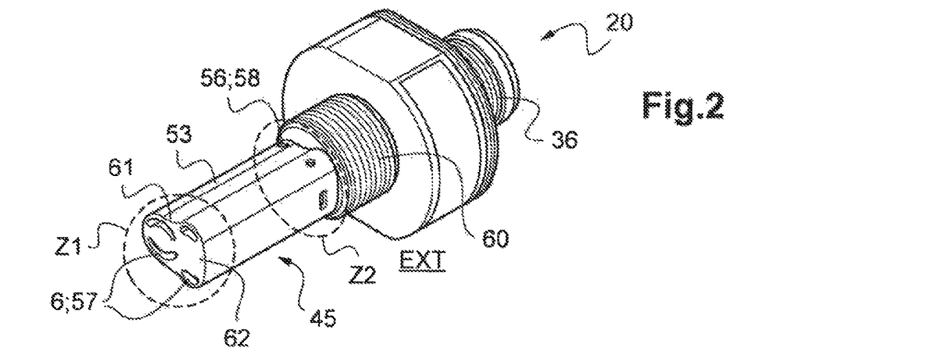
FIGS. 2 and 3 are two views of an immersion detector of the invention provided with a capacitive detector and with a thermoresistive detector.
Figure 3:
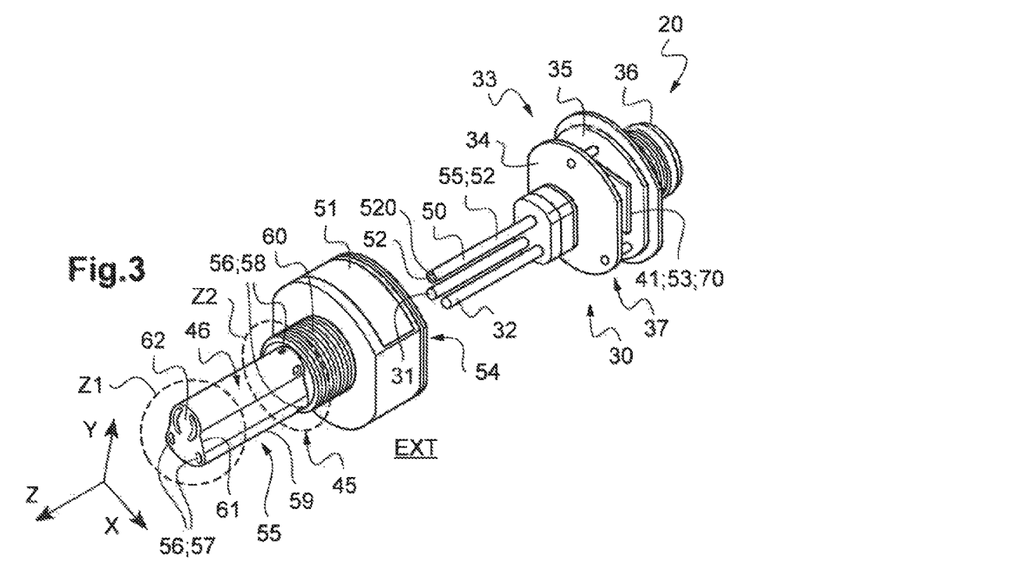

FIGS. 2 and 3 show an immersion detector 20. In particular, FIG. 3 is an exploded view of the immersion detector 20 of FIG. 2.

With reference to FIG. 3, the immersion detector 20 includes a thermoresistive detector 30.

Such a thermoresistive detector 30 is provided with two temperature probes 31 and 32 that extend in elevation along an elevation direction Z from a base 33.

Each temperature probe may be a PT100 type probe connected to a first control and measurement unit 41. By way of example, the first control and measurement unit 41 possesses a processor, an integrated circuit, a programmable system, a logic circuit, these examples not limiting the scope of the term "first control and measurement unit".

The first control and measurement unit 41 is arranged in the base 33.

By way of example, the base 33 has a top plate 34 carrying the temperature probes 31 and 32, and a bottom plate 35. The bottom plate 35 is axially offset in elevation from the top plate 34. Under such circumstances, the bottom plate 35 and the top plate 34 define axially in elevation a space referred for convenience as the "measurement" space 37. This measurement space is occupied at least in part by the first control and measurement unit 41.

This first control and measurement unit 41 may be an ordinary prior art thermoresistive detector unit. Under such circumstances, the first control and measurement unit 41 responds to a temperature of each temperature probe 31 and 32 to generate first immersion information when the temperature probes are immersed at least in part in a fluid. In particular, the fluid may be sea water, for example. This first information may be in the form of a value of a discrete signal, for example. By way of illustration, the discrete signal may take a zero value in the absence of immersion and the value "1" if immersion is detected.

Furthermore, the immersion detector 20 includes a capacitive detector 50.

In conventional manner, the capacitive detector 50 presents an electrical capacitor 55. The capacitor 55 has at least one metal plate 52 (for example an "armature" in French language) defining an open detection space 520. This open space is said to be "open" insofar as the open space is in fluid flow communication with an external medium situated outside the immersion device.

Under such circumstances, the capacitor 55 is carried by the base 33. For example, the capacitor extends out from the base in elevation substantially parallel to the temperature probes 31 and 32.

In addition, the capacitive detector 50 has a second control and measurement unit 53 connected to the capacitor 55. By way of example, the second control and measurement unit 53 possesses a processor, an integrated circuit, a programmable system, a logic circuit, these examples not limiting the scope of the term "second control and measurement unit".

The second control and measurement unit may be arranged in the measurement space 37.

By way of example, a portion of an electronic card includes a first electronic circuit embodying the first control and measurement unit, and a second electronic circuit embodying the second control and measurement unit.

The second control and measurement unit may be of conventional form. Thus, the second control and measurement unit 53 may respond to an electrical capacitance of the capacitor 55 to generate second immersion information when the capacitive detector 50 is at least partially immersed in the fluid. This second information may be in the form of a value of a discrete signal, for example. By way of illustration, the discrete signal takes a zero value in the absence of immersion and the value "1" if immersion is detected.

Furthermore, a cap 45 protects the temperature probes 31 and 32 and the capacitor 55. The cap 45 is hollow and defines an inside space 54. The temperature probes 31 and 32 and the capacitor 55 are then housed in this inside space 54.

Specifically, the cap 45 has a metal side wall 59 defining the internal space 54 laterally. This side wall may comprise a looped surface 46, and in particular it may be a cylindrical side wall 59. The term "cylindrical" means that the side wall may be obtained by sweeping a generator line around a closed loop.

The side wall extends in elevation from a root 60 to a tip 61. The root 60 is secured to a mount 51 of the cap 45. The mount 51 may be in the form of a metal casing having an open face in order to be capable of being passed over the base 33. The first plate and the measurement space are then arranged in this casing of the mount 51. An avionics connector 36 secured to the base 33 may possibly project from the casing.

Sealing means may also be arranged between the casing and the base 33 in order to make the measurement space 37 leaktight.

Furthermore, the cap 45 shown diagrammatically includes a top wall 62 closing its tip 61.

Under such circumstances, the cap 45 may have orifices 56 for putting the temperature probes 31 and 32 and the open space 520 of the capacitor into fluid flow communication with an external medium EXT.

These orifices 56 are arranged in at least two distinct zones Z1 and Z2 of the cap 45 that are offset in elevation. Each zone also advantageously includes a plurality of orifices 56 arranged circumferentially.

In particular, at least one top orifice 57 is arranged in the top wall 62 and at least one bottom orifice 58 is arranged in the side wall 59.

The root of the side wall may possess a thread on its outside face and each bottom orifice may be positioned in the immediate vicinity of the thread, and in particular as close as possible to the thread.

Furthermore, the immersion detector 20 is provided with a processor unit 70 in communication with the first control and measurement unit 41 and with the second control and measurement unit 53.

By way of example, the processor unit possesses a processor, an integrated circuit, a programmable system, a logic circuit, these examples not limiting the scope of the term "processor unit". The processor unit may be arranged in the measurement space 37.

For example, a portion of an electronic card may include a third electronic circuit embodying the processor unit. This third electronic circuit is then connected to the first electronic circuit and to the second electronic circuit.

The processor unit can generate and transmit at least one output signal S1, S2 indicating that the immersion detector 20 is immersed when in the presence of the first immersion information and the second immersion information.

Figure 4:
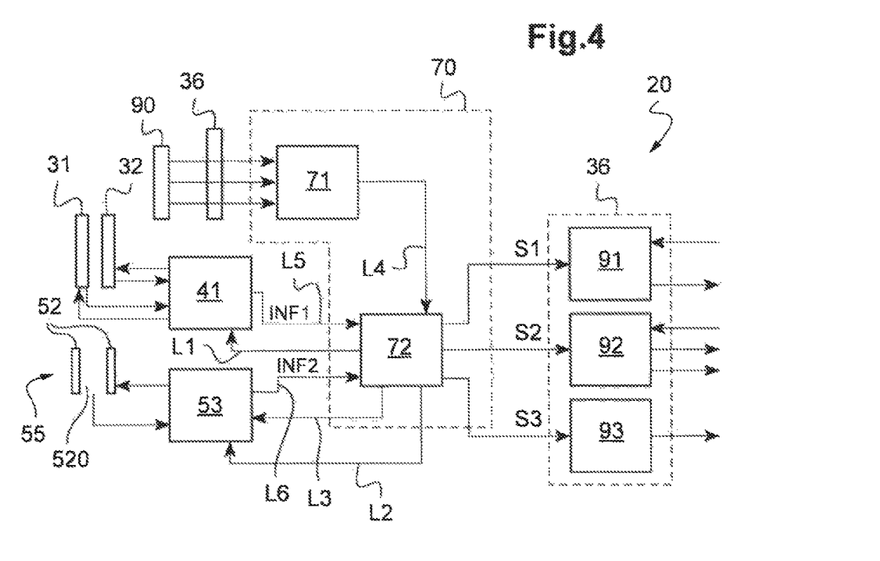
FIG. 4 is a block diagram showing the electronic members of the immersion detector and illustrating the method of the invention.

With reference to FIG. 4, the processor unit 70 includes an electrical power supply device 71 connected to an electric circuit 90.

By way of example, the electrical power supply device 71 comprises an electronic card suitable for converting a voltage coming from the electric circuit into a voltage presenting a particular value. Furthermore, the electronic card may possess a conventional filter module for limiting the consequences of a lightning strike or of electromagnetic disturbances on the immersion detector.

Furthermore, the processor unit 70 has a microcontroller 72. The microcontroller 72 is connected to the first control and measurement unit 41 and to the second control and measurement unit 53 and also to the electrical power supply device 71.

Under such circumstances, the microcontroller electrically powers both the first control and measurement unit 41 and the second control and measurement unit 53 via power supply lines L1 and L2.

In addition, the microcontroller communicates with the first control and measurement unit 41 and with the second control and measurement unit 53. In conventional manner, the microcontroller can thus verify that the thermoresistive detector is operating properly and that the capacitive detector is operating properly via monitoring connections L3 and L4. The microcontroller also receives data coming from the first control and measurement unit 41 and from the second control and measurement unit 53 via data lines L5 and L6.

Furthermore, the microcontroller is connected to a connector 36 to transmit data to the outside of the immersion detector, e.g. to a buoyancy system and/or a distress beacon and/or a warning system. The same connector 36 may be used for connecting the electric circuit 90 to the electrical power supply device 71.

In the method of the invention, the temperature probes 31 and of 32 of the thermoresistive detector are powered electrically by the first control and measurement unit 41 using different electric currents. The temperature probes thus present temperatures that are different due to being themselves heated differently when not immersed. The first control and measurement unit 41 does not then send the first information INF1 representing the presence of a liquid to the microcontroller 72.

Likewise, the capacitor 55 is electrically powered by the second control and measurement unit 53. The capacitor 55 then presents some particular capacitance when not immersed. The second control and measurement unit then does not send the second information INF2 representative of the presence of a liquid to the microcontroller.

When the immersion detector is immersed in a liquid, the liquid reaches the inside space 54, in particular by passing through the orifices in the cap 45.

Under such circumstances, the temperature difference between the two temperature probes is reduced because of the thermal inertia of the liquid. The first control and measurement unit 41 generates first information INF1 that is transmitted to the microcontroller.

For example, the first control and measurement unit 41 determines a gradient that is a function of variation in the temperature difference between the two temperature probes 31 and 32. This gradient is compared with a threshold, optionally determined using the following relationship:

$$GTH = C1*DT + C2$$

where "GTH" represents said gradient threshold, "DT" represents the measurement duration, and "C1" and "C2" represent predetermined constants, "*" representing the multiplication sign and "+" representing the addition sign.

Furthermore, the threshold may be bounded.

The first information INF1 representing immersion is then transmitted when the gradient is greater than the threshold.

Likewise, the liquid penetrates into the opening space 520 and modifies the capacitance of the capacitor of the capacitive detector. Consequently, the second control and measurement unit 53 generates second information INF2 representing immersion that is transmitting to the microcontroller.

When the microcontroller receives both the first information and the second information together, the microcontroller generates and issues at least one output signal S1, S2 indicating that the immersion detector is immersed.

By way of example, the two output signals S1 and S2 are transmitted to the outside of the immersion detector via two outputs 91 and 92.

Furthermore, the microcontroller may monitor the temperature probes and the capacitor, and thus transmit a failure signal S3 via an output 93.

The various outputs may be in the form of elements of the avionics connector 36.

Furthermore, the immersion detector may possess an additional member for minimizing the impact of a stream of air on the operation of the immersion detector.

Figure 5:
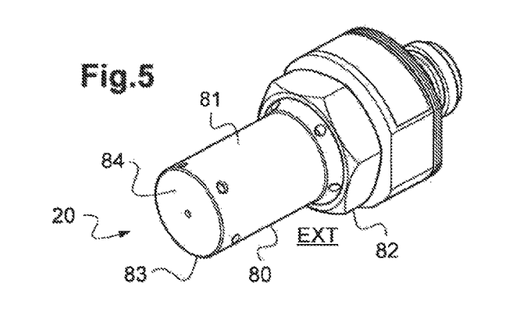
FIGS. 5 to 7 are views of the immersion detector of FIGS. 2 and 3 fitted with a hood.
Figures 6, 7:
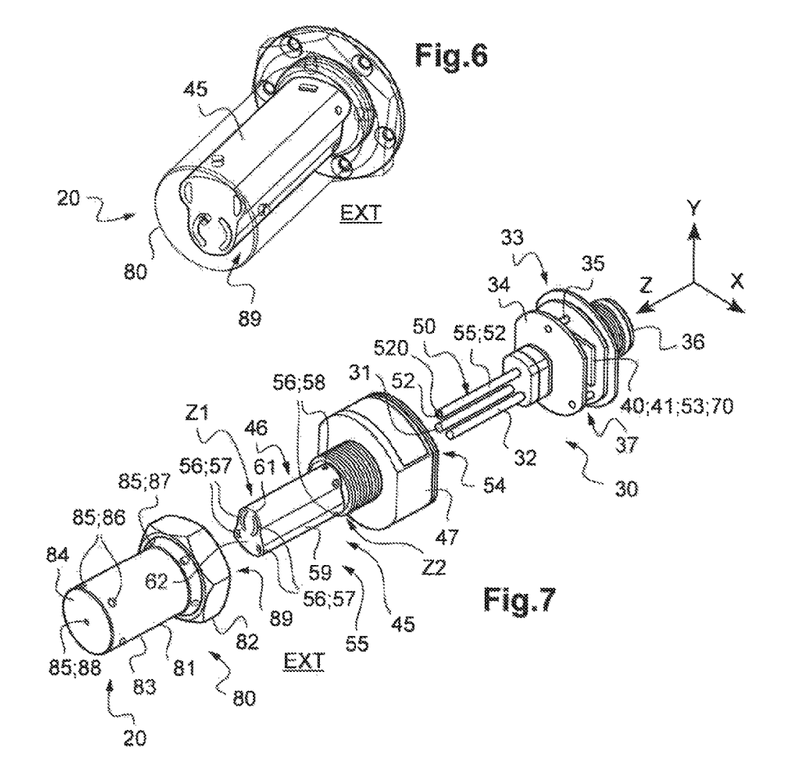

FIGS. 5 to 7 thus show an immersion detector having a hood 80 for performing this function.

In particular, FIG. 5 shows a hood 80 screwed onto the cap 45. In FIG. 6, the hood is drawn transparently in order to show the cap 45.

Finally, FIG. 7 is an exploded view of the immersion detector 20 fitted with a hood 80.

With reference to FIG. 7, the hood 80 surrounds the cap 45, at least in part.

Thus, the hood 80 includes a side partition 81 laterally defining an inside volume 89. This lateral partition may correspond to a looped surface, and in particular it may be a cylindrical side partition. The term "cylindrical" means that the side wall may be obtained by sweeping a generator line around a closed loop.

This side partition extends in elevation from a seat 82 to a head 83. The seat 82 is in the form of a nut suitable for being screwed onto the thread of the cap 45.

Furthermore, the hood 80 includes a top partition 84 that closes the head 83.

Under such circumstances, the hood is screwed onto the cap 45, this metal plate being arranged in the inside volume 89.

To allow liquid to reach the inside space 54, at least one opening 85 is made in the hood.

For example, at least one top opening 88 is made in the top partition 84, and at least one side opening 86, 87 is made in the side partition 81. Like the cap, the side partition may in particular include at least one bottom side opening 87 and at least one top side opening 86.

Optionally, none of the openings in the hood 80 leads directly to an orifice in the metal plate.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An immersion detector provided with a thermoresistive detector having at least two temperature probes projecting from a base and extending in elevation along an elevation direction (Z), the thermoresistive detector including a first control and measurement unit connected to each temperature probe, the first control and measurement unit responding to a temperature of each temperature probe to generate first immersion information (INF1) when the thermoresistive detector is immersed in a fluid, wherein the immersion detector includes a capacitive detector, the capacitive detector having a capacitor provided with at least one metal plate projecting from the base and extending in the elevation direction, the capacitive detector having a second control and measurement unit connected to the capacitor, the second control and measurement unit responding to the capacitance of the capacitor to generate second immersion information (INF2) when the capacitive detector is immersed in the fluid, the immersion detector having a processor unit in communication with the first control and measurement unit and with the second control and measurement unit to generate and transmit an output signal (SI) indicating that the immersion detector is immersed when in the presence of the first immersion information (INF1) and of the second immersion information (INF2), the immersion detector having a cap surrounding the temperature probes and the capacitor, the cap presenting orifices putting the temperature probes and the capacitor into fluid flow communication with an external medium (EXT) surrounding the immersion detector;

wherein the first control and measurement unit determines a gradient that is function of variation in temperature difference between the two temperature probes over a measurement duration, and the first control and measurement unit compares the gradient with a threshold, the first immersion information (INF1) being issued when the gradient is greater than the threshold.

2. An immersion detector according to claim 1, wherein the threshold is determined using the following relationship:

$$GTH=C1*DT+C2$$

where "GTH" represents the gradient threshold, "DT" represents the measurement duration, and "C2" and "C2" represent predetermined constants, "*" representing the multiplication sign and "+" representing the addition sign.

3. An immersion detector according to claim 1, wherein the base houses the first control and measurement unit.

4. An immersion detector according to claim 3, wherein the base houses the processor unit.

5. An immersion detector according to claim 1, wherein the processor unit includes an electrical power supply device and a microcontroller, the electrical power supply device being for connection to an electric circuit outside the immersion detector, the microcontroller being connected to the first control and measurement unit and to the second control and measurement unit.

6. An immersion detector according to claim 1, wherein the orifices are arranged in at least two distinct zones (Z1, Z2) of the cap that are offset in elevation.

7. An immersion detector according to claim 1, wherein the cap includes a side wall laterally defining an inside space that extends in elevation from a root to a tip, the cap including a top wall closing the tip, the temperature probes and the capacitor being arranged at least in part in the inside space.

8. An immersion detector according to claim 7, wherein at least one top orifice is arranged in the top wall and at least one bottom orifice is arranged in the side wall.

9. An immersion detector according to claim 1, wherein the cap surrounds the base, at least in part.

10. An immersion detector according to claim 1, wherein the immersion detector includes a hood surrounding the cap at least in part, the hood comprising a side partition laterally defining an inside volume, the side partition extending in elevation from a seat to a head, the hood having a top partition closing the head, the cap being arranged at least in part in the volume.

11. An immersion detector according to claim 10, wherein at least one top opening is formed in the top partition, and at least one side opening is formed in the side partition.

12. An immersion detector according to claim 11, wherein none of the openings in the hood leads directly to an orifice in the cap.

13. An aircraft, wherein the aircraft is provided with at least one immersion detector according to claim 1.

14. An aircraft according to claim 13, wherein the aircraft is provided with a single immersion detector according to claim 1.

15. An aircraft according to claim 13, wherein the aircraft extends transversely from a right side to a left side on either side of an anteroposterior plane of symmetry, the aircraft extending longitudinally from a front end to a rear end on either side of a midplane of symmetry orthogonal to the anteroposterior plane, the aircraft being provided with at least two immersion detectors according to claim 1 arranged respectively at the front end and at the rear end of the aircraft or on the left side and on the right side of the aircraft.

16. A method of detecting immersion with an immersion detector according to claim 1, the method comprising the following steps:
when the thermoresistive detector is immersed in a fluid, the first control and measurement unit generating first immersion information (INF1) as a function of the temperatures of each the temperature probes;
when the capacitive detector is immersed in the fluid, the second control and measurement unit generating second immersion information (INF2) as a function of the capacitance of the capacitor; and
the processor unit generating and transmitting an output signal (S1) indicating the immersion detector is immersed when the processor unit is in the presence of the first immersion information (INF1) and the second immersion information (INF2).

17. A method according to claim 16, wherein the first control and measurement unit determines a gradient that is a function of variation in temperature difference between the two temperature probes over a measurement duration, and the first control and measurement unit compares the gradient with a threshold, the first immersion information (INF1) being issued when the gradient is greater than the threshold.

18. A method according to claim 16, wherein the threshold is determined using the following relationship:

$$GTH=C1*DT+C2$$

where "GTH" represents the gradient threshold, "DT" represents the measurement duration, and "C1" and "C2" represent predetermined constants, "*" representing the multiplication sign and "+" representing the addition sign.

19. An immersion detector provided with a thermoresistive detector having at least two temperature probes projecting from a base and extending in elevation along an elevation direction (Z), the thermoresistive detector including a first control and measurement unit connected to each temperature probe, the first control and measurement unit responding to a temperature of each temperature probe to generate first immersion information (INF1) when the thermoresistive detector is immersed in a fluid, wherein the immersion detector includes a capacitive detector, the capacitive detector having a capacitor provided with at least one metal plate projecting from the base and extending in the elevation direction, the capacitive detector having a second control and measurement unit connected to the capacitor, the second control and measurement unit responding to the capacitance of the capacitor to generate second immersion information (INF2) when the capacitive detector is immersed in the fluid, the immersion detector having a processor unit in communication with the first control and measurement unit and with the second control and measurement unit to generate and transmit an output signal (SI) indicating that the immersion detector is immersed when in the presence of the first immersion information (INF1) and of the second immersion information (INF2), the immersion detector having a cap surrounding the temperature probes and the capacitor, the cap presenting orifices putting the temperature probes and the capacitor into fluid flow communication with an external medium (EXT) surrounding the immersion detector;
wherein the immersion detector includes a hood surrounding the cap at least in part, the hood comprising a side partition laterally defining an inside volume, the side partition extending in elevation from a seat to a head, the hood having a top partition closing the head, the cap being arranged at least in part in the volume,
wherein the seat is screwed to a root of the cap.

* * * * *